MAGNETIC CORE TRANSISTOR LOGIC CIRCUIT

Filed March 21, 1961

INVENTORS
DEREK ELDREDGE
JOHN KENNETH AYLING
ANTONY PROUDMAN

BY Joseph C. Redmond, Jr.
ATTORNEY 3,233,114
Patented Feb. 1, 1966

3,233,114

MAGNETIC CORE TRANSISTOR LOGIC CIRCUIT

Derek Eldridge and John Kenneth Ayling, Winchester, and Antony Proudman, Awbridge, Romsey, England, assignors to International Business Machines Corporation, New York, N.Y., a corporation of New York Filed Mar. 21, 1961, Ser. No. 97,295
Claims priority, application Great Britain, June 14, 1960, 20,800/60
9 Claims. (Cl. 307—88)

Figure 1:
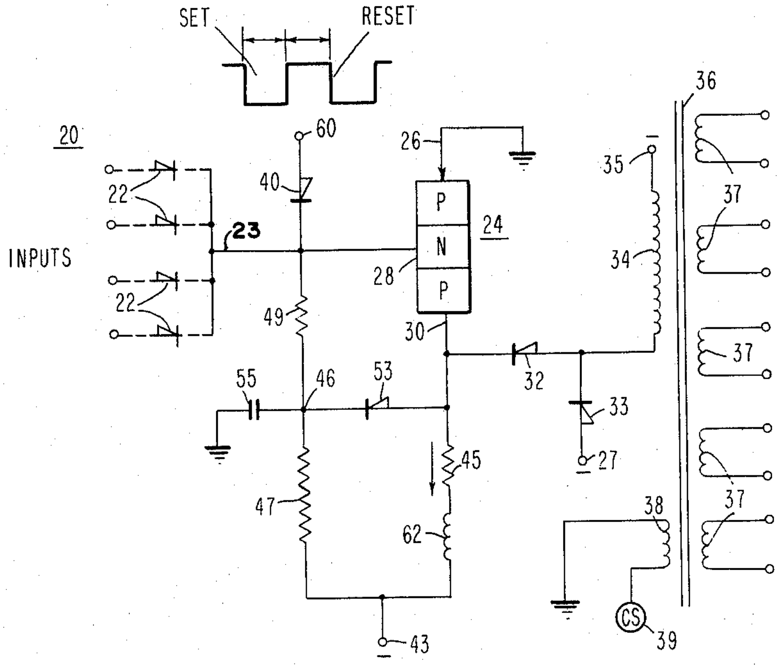

This invention relates to logic circuits and more particularly to logic circuits employing magnetic cores and transistor elements as the active elements thereof.

One requirement of logic circuits is to provide output signals of defined length when a signal is stored therein, and to prevent spurious signals from appearing in the output thereof when a signal has not been stored in the circuit. Heretofore, these requirements have been fulfilled in magnetic core-transistor logic circuits by setting or switching a defined amount of flux into the core and resetting or unloading the core fully, the output signal from the circuit being a defined length according to the amount of flux switched into the core. During rapid setting and resetting, however, it is possible for the core to be reset incompletely which results in output pulses from the circuit being slightly different in length. When an incomplete reset occurs and an input signal has not been supplied to the circuit, spurious signals will also appear in the output, the spurious signals originating from the residual flux remaining in the core after the incomplete resetting thereof. As a consequence, it is necessary in such logic circuits to provide additional circuit means to insure fully the proper resetting of the core and to prevent spurious signals from appearing in the output of the circuit. The additional circuitry may encumber the operating speed of the logic circuit as well as increase the costliness thereof.

A general object of the invention is a logic circuit adapted to provide output pulses of defined length when a signal is stored in the circuit and to prevent spurious signals from appearing in the output thereof when no signal is stored in the circuit.

One object is a magnetic core-transistor logic circuit which does not require additional circuitry to obtain output signals of defined length and to suppress spurious signals in the output thereof.

Another object is an inverting magnetic core-transistor logic circuit adapted to drive a plurality of similar logic circuits.

Another object is a magnetic core building block suitable for forming a system organization capable of performing logical switching functions and wherein only two voltage supplies and a timing source are required for the operation of a building block.

Still another object is an improved two-phase synchronous logic system.

In an illustrative embodiment of the invention, a magnetizable element or core having two stable remanent states is normally biased by suitable means into one of the saturation states. The core is connected to a source of timing pulses through a transistor switch and a gating circuit, the source of timing pulses being adapted alternately to turn on and off the switch to set or drive the core fully toward the other stable state and reset or partially return the core to the one stable state, respectively.

A coincidence circuit is adapted to turn off the gate when preselected signals are received. When the source of timing pulses is connected to the core, output signals of the same length are produced from the core since the fully set core is reset the same amount each time by the timing pulses. When the coincidence circuit operates to disconnect the timing pulses from the core, the biasing means resets the core fully prior to reset so that during readout, which occurs during the reset period, no spurious output signals can occur from the core.

One feature of the invention is a logic circuit including means alternatively setting or switching fully and partially resetting a core to produce output pulse lengths of defined length when preselected signals are supplied to a coincidence circuit.

Another feature is means for resetting fully a core when preselected signals are supplied to a coincidence circuit, the resetting occurring before readout of the core occurs which thereby prevents spurious output signals originating from residual flux in the core.

Still another feature is means eliminating the transient load on a logic circuit during readout thereof thereby permitting the logic circuit to drive a plurality of similar circuits.

Figure 2:
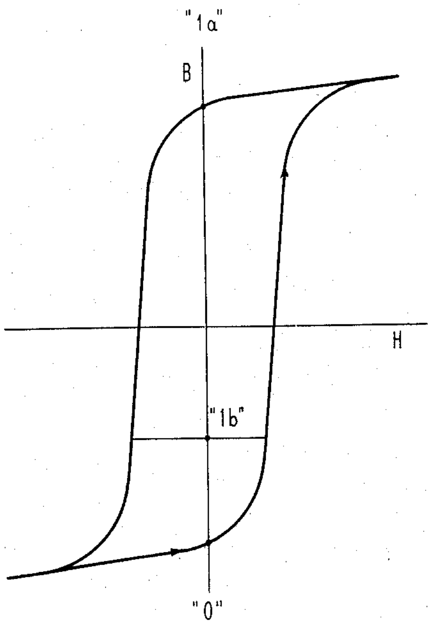

The foregoing and other objects, features and advantages of the invention will be apparent from the following more particular description of a preferred embodiment of the invention, as illustrated in the accompanying drawings, wherein:

FIG. 1 is an electrical schematic of one embodiment of the present invention; and FIG. 2 illustrates the approximate form of a hysteresis loop of a magnetic core employed in the invention of FIG. 1.

Referring to FIG. 1, the logic circuit of the present invention comprises an input or coincidence circuit 20 including a plurality of conventional diodes 22 connected together in an "OR" circuit configuration. It will become apparent hereinafter that the input circuit need not be limited to an "OR" circuit, but that other types of coincidence circuits may be employed in the invention as for example, a conventional "AND" circuit. In FIG. 1, the coincidence circuit is connected through a common lead 23 to a transistor 24, as for example a PNP type, having an emitter 26 connected to a reference potential, a base 28 connected to the common lead and a collector 30 connected to a biasing supply 43. The transistor is connected in the well known common emitter configuration and is biased appropriately from the source 43 which is connected across the collector-base junction by suitable impedances including inductor 62 and resistors 45, 47 and 49. A diode 53 is connected to a junction 46 which is between the resistors 47 and 49 and to the collector 30 to prevent saturation of the transistor. A capacitor 55 is connected between the junction 46 and a reference potential, typically ground for reasons more apparent hereinafter.

The collector 30 is also connected through a blocking diode 32 to a reset winding 34 which is part of a magnetizable element 36, typically a toroidal core, the reset winding being connected at the other end to a reset supply 35. The collector end of the reset winding is clamped to a suitable voltage supply 27 through a diode 33. Also included on the core is a plurality of output windings 37 and a set winding 38, the latter being connected to a suitable current supply 39. Each output winding is connected to a logic circuit similar to that shown in FIG. 1 to form a two-phase synchronous system as will be explained hereinafter.

A source 60 of timing pulses is connected through a gating device 40, typically a conventional diode to the common connection 23 between the input circuit 20 and the base 28 of the transistor. The source of timing pulses may take any one of several forms, an example of a timing source being a conventional blocking oscillator which is well known in the art.

Prior to the application of a signal to the coincidence circuit, the transistor is normally bised off by the voltage level of the coincidence circuit applied to the base 28. With the transistor biased off, current flows from the source 35 to the collector circuit by way of the reset winding 34 and the blocking diode 32. The inductor 62 stabilizes current in the loop. Current also flows in the set winding 38, the current in the reset winding, having the same magnitude as that in the set winding but producing a greater m.m.f. than that in the set winding. The core as a result of the flux direction therein, is normally driven to a saturated or fully reset condition, as shown in FIG. 2. The timing source, when connected to the transistor, is arranged to supply the transistor a simple square wave with a 1.1 mark-space ratio, provided the gate 40 has not been turned off. During the mark period the timing source is adapted to turn on the transistor and drive the core to the fully set or "$1_a$" condition (see FIG. 2) as will be explained hereinafter. During the space period, the timing source is adapted to turn off the transistor to permit the biasing supply to reset the core to a partially reset condition "$1_b$" shown in FIG. 2. It will be apparent from the preceding description that without any signal input to the coincidence, the core is repeatedly set and partially reset between points $1_a$ and $1_b$ as indicated in FIG. 2. For reasons of simplicity in explanation, the timing source will hereinafter be referred to having a set period and a reset period.

Having described the normal condition of the circuit without a signal input thereto, the remaining paragraphs of the specification will be devoted to the operation of the present invention with positive and negative signal inputs thereto. It should be appreciated, of course, that the circuit operation to be described for positive and negative signals is only intended to be illustrative and the circuit may be made to operate reversely to that described by modifications thereto which are believed to be apparent to a worker skilled in the art. The present method of operation and the circuit arrangement therefor have been selected solely for reasons of convenience in explanation.

When a positive signal is supplied to the coincidence circuit, the gate 40 becomes reverse-biased or turned off by said signal and the timing source 60 is disconnected from the transistor 24. As a result, current flows from the source 35 to the source 43 during the set and reset periods of the timing source to reset fully the core to the "0" state. If the core had been only partially reset during the previous timing period, the current from source 35 operates to reset fully the core which remains in the "0" condition so long as the positive signal is present at the coincidence circuit.

When a negative input is supplied to the coincidence circuit, the gate 40 is forward biased or closed and the transistor is turned on by the set pulse which results in D.C. current flowing in the collector circuit of the transistor. Excessive saturation of the transistor is avoided by the feedback diode 53 which operates in a manner well known in the art. The potential in the collector circuit rises with current flow to place the blocking diode 32 in a reverse biased condition. Accordingly, current flow through the reset winding terminates. The current flow in the set winding, however, continues to flow and drives the core to the fully set or "$1_a$" condition. Thereafter, the transistor is turned off by the timing source during the reset period which reduces the current and potential in the collector circuit to permit current to flow from the source 35 to the reset winding 34 as previously described. Current flow from the source 35 only occurs long enough, however, to reset partially the core to the "$1_b$" condition. Thereafter, the set pulse reappears to drive the core to the fully set or "$1_a$" condition provided of course the negative signal is still being supplied to the coincidence circuit.

Thus, rather than setting a limited amount of flux in the core so as to obtain a defined output length during reset, the core of the present invention is allowed to switch fully and the output pulse length is determined by the timing source wave form. The fully setting and partially resetting of the core continues repeatedly so long as the appropriate input signal is being received at the coincidence circuit. When the opposite pulse is supplied to the coincidence circuit, the timing source is disconnected and the switch is turned off, the residual flux being removed completely at the first set period. Thus, during the succeeding reset period no residual flux will be present in the core.

If the circuit is adapted to operate as an inverter, that is receive input signals during the set period and provide output signals during the reset period, a number of additional advantages can be obtained from the circuit. Modifying the circuit for inverting operation is readily performed by inserting a diode (not shown) in each output circuit to pass current of selected polarity. The selected current can be that which normally would occur during the reset period.

One of the advantages from inverting operation is the elimination of spurious signals in the output of the circuit. It will be appreciated that when a positive signal is applied to the coincidence circuit during the set period, the transistor is turned off immediately and the reset circuit operates to return the core to the "0" condition. Thus, during readout which occurs during the reset period, the core is fully reset and hence no signal can appear in the output circuit from residual flux in the core.

Another advantage of inverting operation is that a single logic circuit may be employed to drive a plurality of similar circuits in a two-phase synchronous system which is defined as a plurality of logic circuits wherein the input to one circuit and readout from a previous circuit occur during the set period and reset periods respectively, both periods, however, occurring at the same instant in time. By receiving output signals at one circuit from a previous circuit during the reset and set periods thereof, respectively, it should be appreciated that the transistor 24 of the previous stage is turned off thereby eliminating the transient load on the stage. The loading on a stage as a consequence, is relatively small and only a small base current need be supplied to load the succeeding circuit. It has been found, as a result, that as many as ten stages can be driven from the circuit of the present invention. Also, since succeeding stages are in the reset condition when a core of a previous stage is loaded the D.C. set amplitude of the previous stage has only to be large enough to set an unloaded core.

To simplify the circuit arrangement for a plurality of similar stages, it is believed evident that a single source of timing pulses can be employed to time each stage. A simple interconnecting link (not shown) may also be employed to provide synchronization to all of the timing sources. The capacitor 55 in each stage will permit a delay in the start of a set period sufficient to adapt successive stages for input timing variations. Each stage may be further simplified by connecting the set and collector sources 27 and 43 respectively together so that only two voltages and a timing wave form are required to operate a stage. Further the current source 39 need not be provided externally since a well defined current is available through resistor 45 and inductor 62 to link winding 38 before returning to the source 43.

The present invention also permits high speed operation while retaining uniform pulse output. In prior circuits, high speeds involved changes in temperature as a result of which the saturation levels of the cores varied considerably, varying the pulse output. Also the output is not dependent on a well defined saturation level but rather a well defined timing wave.

In summary, the feature of fully setting and partially resetting the core before readout, eliminates the necessity of including additional circuitry to obtain output pulses of defined length and to suppress spurious signals in the output of the logic circuit. Since the present invention can drive a plurality of other stages, it may be employed as an inexpensive magnetic core building block in a two-phase synchronous system with improved performance, each block having the enhanced operation, previously indicated.

While the invention has been particularly shown and described with references to a preferred embodiment thereof, it will be understood by those skilled in the art that various changes in form and details may be made therein without departing from the spirit and scope of the invention.

What is claimed is:

1. A logic circuit comprising a magnetizable element having first and second stable remanent states, set means and reset means adapted to drive the element toward the first and second stable remanent states, respectively, first means rendering the set means continuously conducting to maintain the element in a first saturated state, second means connected to said reset means and repetitively rendering the reset means conducting during a first period and nonconducting during a second period whereby the element is driven from the first saturated state toward the second saturated state during the first period and returned to the first saturated state during the second period, third means responsive to preselected signals to disconnect the second means from said reset means whereby the element is driven fully to a second saturated state, and output circuit means coupled to said element and providing output signals of defined duration determined by the second means.

2. The logic circuit defined in claim 1 further including an impedance element connected between the reset means and the second means whereby the impedance is rendered conducting during the first period of the second means and rendered nonconducting during the second period of the second means.

3. The logic circuit defined in claim 2 further including an impedance element for adjusting the conducting duration of the reset means during the first period of the second means and means for providing signals to the third means during the first period of the second means and receiving output signals from the output means during the second period of the second means.

4. A logic circuit comprising a magnetizable element having first and second stable remanent states, set and reset means having output voltages sufficient to drive the element toward the first and second stable states respectively, the magnitude of the set voltage being less than that of the reset voltage, said set means normally connected to said element to drive the element to the first stable state, switching and timing means including a switch, a gate and a source of timing pulses, the switch connected to the reset means and to the source of timing pulses through the gate, the timing pulses operating the switch alternately to render the reset means conductive and nonconductive, the element being partially reset toward the second stable state by the reset means when conductive and when the reset means is nonconductive the element being set fully to the first stable state by the set means, and an input circuit responsive to preselected signals to turn off the gate and disconnect the timing source from the switch whereby the reset means is connected to the element to drive the element fully toward the second stable state.

5. A logic circuit comprising a transistor switch including emitter, base and collector electrodes and connected in a common-emitter circuit configuration, a source of timing pulses including a gate connected to the base electrode to turn on and off alternately the switch, an input circuit adapted to turn off the gate and disconnect said timing source from said base electrode when preselected signals are received, a magnetizable element having two stable remanent states, said element including set and reset means, the reset means being connected to the transistor switch, said set means normally energized to drive the element to one of the stable states, said reset means being energizable alternately by the switch to overcome the set means and drive the element partially toward the other stable state, output circuit means coupled to the element and adapted to develop output signals corresponding to the magnetic state of the element, and means coupled to the gate and the switch, said means responsive to a first input signal to operate the switch to permit the reset means to reset fully the element whereby no output signal is developed in the output circuit, said means responsive to a second input signal to operate the switch to permit the set and reset means to set fully and reset partially respectively the element whereby an output signal of uniform and defined length is developed in the output circuit.

6. The logic circuit as defined in claim 5 including means to delay the turn on of the transistor switch.

7. The logic circuit as degned in claim 6 wherein the input circuit is a combinatorial logic circuit.

8. A logic circuit comprising a magnetizable element having first and second stable remanent states, set and reset means continuously connected to the element and normally in a conducting condition, the set means developing a magnetomotive force sufficient to drive the element toward the first stable state, the reset means developing a larger magnetomotive force than that of the set means, timing means connected to the reset means and adapted to alternately render the reset means nonconducting for one interval whereby the element is set fully to the first stable state by the set means and in a second interval to return the reset means to a conducting condition whereby the element is reset partially toward the second stable state, output means coupled to the element and developing defined output pulses in accordance with the setting and partial resetting of the element and input means connected to the timing means, said input means responsive to a preselected signal to interrupt the setting and partial resetting of the element to enable the reset means to drive the element fully to the second stable state so that no output signal is developed in the output circuit.

9. A logic circuit comprising a magnetizable element having first and second stable remanent states, set means connected to the element and developing a magnetomotive force to drive the element to the first stable state, reset means connected to the element and developing a larger magnetomotive force than that of the set magnetomotive force to drive the element to the second stable state, a unilateral conducting device having two terminals, one terminal connected to the reset means, a transistor switching circuit connected to the other terminal of the unilateral conducting device, a source of timing pulses adapted to turn the transistor switch on and off, means preventing saturation of the transistor switch when turned on, means delaying the transistor from turning on, the timing pulses having duration and polarities such that in one duration the switch is adapted to render the reset means conducting for an interval whereby the magnetizable element is reset partially toward the second state and in the next duration the switch is operated to render the reset means nonconducting whereby the element is driven to the first stable state by the set means, and input means connected to the transistor switch and responsive to a preselected signal to interrupt the setting and partially resetting of the element to permit the switch to operate the reset means to drive the element fully to the second stable state.

References Cited by the Examiner

UNITED STATES PATENTS

| | | | |
|---|---|---|---|
| 2,777,098 | 1/1957 | Duffing et al. | 340—174 X |
| 2,798,169 | 7/1957 | Eckert | 307—88 |
| 2,823,321 | 2/1958 | Sims | 307—88 |
| 2,846,593 | 4/1958 | Sands | 307—88 |

IRVING L. SRAGOW, *Primary Examiner.*

JOHN F. BURNS, *Examiner.*